UNITED STATES PATENT OFFICE.

WILHELM PICKHARDT, OF NEW YORK, AND HERMANN ENDEMANN, OF BROOKLYN, N. Y.

HYDROCHLORATE OF OXYCHINOLINE.

SPECIFICATION forming part of Letters Patent No. 257,829, dated May 9, 1882.

Application filed March 21, 1882. (Specimens.)

*To all whom it may concern:*

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Medical Compounds, of which the following is a specification.

This invention relates to a medical compound prepared by the action of hydrochloric acid on the oxychinoline described in Letters Patent No. 237,918, granted to Z. H. Skraup, February 15, 1881.

In carrying out our invention we dissolve the above-named oxychinoline of Skraup in a sufficient quantity of strong hydrochloric acid diluted with an equal quantity of water, and then evaporate for crystallization. The crystals are freed from the mother-liquor, redissolved in water, and the solution thus obtained, after decolorization with animal charcoal, is evaporated for crystallization.

Our hydrochlorate of oxychinoline is soluble in very little hot water; but of cold water a larger quantity is required for solution. It is not hygroscopic. It is easily soluble in alcohol. Its solutions give the reactions for hydrochloric acid and for oxychinoline.

The principal advantage of our compound is that the same dissolves freely in hot and in cold water, and it can therefore be administered in solution, while the oxychinoline itself is almost insoluble in water, and in its pure state it can be administered only in the form of a powder.

What we claim as new, and desire to secure by Letters Patent, is—

The hydrochlorate of oxychinoline prepared by the action of hydrochloric acid upon the oxychinoline of Skraup, substantially in the manner above set forth.

In testimony whereof we have hereunto set our hands and seals in the presence of two subscribing witnesses.

WM. PICKHARDT. [L. S.]
H. ENDEMANN. [L. S.]

Witnesses:
W. HAUFF,
E. F. KASTENHUBER.